United States Patent
Roeder et al.

(10) Patent No.: US 11,969,005 B2
(45) Date of Patent: Apr. 30, 2024

(54) METHOD AND DEVICE FOR TREATING NUTS, IN PARTICULAR FOR PRODUCING NUTS WITH IMPROVED SHELLING PROPERTIES

(71) Applicant: ELEA VERTRIEBS-UND VERMARKTUNGSGESELLSCHAFT MBH, Quakenbruck (DE)

(72) Inventors: Isabell Roeder, Sulingen (DE); Vanessa Volkel, Steinfurt (DE); Stefan Topfl, Osnabruck (DE)

(73) Assignee: ELEA SERVICE GMBH, Quakenbruck (DE)

(*) Notice: Subject to any disclaimer, the term of this patent is extended or adjusted under 35 U.S.C. 154(b) by 435 days.

(21) Appl. No.: 16/481,633

(22) PCT Filed: Feb. 5, 2018

(86) PCT No.: PCT/EP2018/052739
§ 371 (c)(1),
(2) Date: Jul. 29, 2019

(87) PCT Pub. No.: WO2018/149675
PCT Pub. Date: Aug. 23, 2018

(65) Prior Publication Data
US 2019/0387783 A1    Dec. 26, 2019

(30) Foreign Application Priority Data
Feb. 20, 2017 (DE) .................... 10 2017 202 684.7

(51) Int. Cl.
*A23N 5/00* (2006.01)
*A23N 5/03* (2006.01)
(Continued)

(52) U.S. Cl.
CPC ............. *A23N 5/002* (2013.01); *A23N 5/006* (2013.01); *A23N 5/008* (2013.01); *A23N 5/03* (2013.01);
(Continued)

(58) Field of Classification Search
CPC .... A23N 5/002–08; A47J 43/26; B02C 19/18; B02C 2019/183
See application file for complete search history.

(56) References Cited

U.S. PATENT DOCUMENTS 2,601,421 A * 6/1952 Thaning .................. A23N 5/08
426/241
2,661,784 A   12/1953 McMillan
(Continued)

FOREIGN PATENT DOCUMENTS

DE        1 179 037        10/1964
GB           750 345         3/1956
WO   WO-2006121397 A1 * 11/2006 ............... A01G 7/04

OTHER PUBLICATIONS

Machine translation of DE 1179037 (Year: 1964).*
(Continued)

*Primary Examiner* — Jimmy Chou
(74) *Attorney, Agent, or Firm* — Mark P. Stone

(57) ABSTRACT

The invention relates to a method for treating shell-fruits (3), in particular for producing shell-fruits (3) with improved shelling properties in comparison to untreated shell-fruits (3). The invention further relates to a device (1) for treating shell-fruits (3), in particular for producing shell-fruits (3) with improved shelling properties in comparison to untreated shell-fruits (3), comprising a hermetically sealable treatment chamber (2) for conditioning the shell-fruits (3). In order to provide a method and a device for treating shell-fruits which do not damage the contents of the kernel and simultaneously permit improved shelling of the shell-fruits and the opened shell to be better separated from the kernel, the method according to the invention comprises softening the shell of the shell-fruits (3) by applying an electric field, and the device according to the invention comprises at least one capacitor (4) for generating an electric field in the treatment chamber (2).

26 Claims, 7 Drawing Sheets

(51) Int. Cl.
A23N 5/08 (2006.01)
A47J 43/26 (2006.01)
B02C 19/18 (2006.01)

(52) U.S. Cl.
CPC .................. *A23N 5/08* (2013.01); *A47J 43/26* (2013.01); *B02C 2019/183* (2013.01)

(56) References Cited

U.S. PATENT DOCUMENTS

| | | | | |
|---|---|---|---|---|
| 2,685,312 | A | * | 8/1954 | Mulvany .................. A23N 5/01 99/549 |
| 2,747,635 | A | * | 5/1956 | Kofoid ..................... A23N 5/00 426/244 |
| 2,995,166 | A | * | 8/1961 | Burley .................. A23N 5/002 426/241 |
| 2003/0165608 | A1 | * | 9/2003 | Cousin ..................... H05B 6/62 426/615 |
| 2009/0139249 | A1 | * | 6/2009 | Cho .......................... A23L 3/36 99/485 |
| 2014/0186499 | A1 | * | 7/2014 | Hukelmann ....... B65D 81/3476 137/565.17 |
| 2016/0015076 | A1 | * | 1/2016 | Goto ........................ H01F 27/29 99/451 |
| 2016/0150905 | A1 | * | 6/2016 | Van Oord ............ H05B 3/0004 426/244 |
| 2018/0116256 | A1 | * | 5/2018 | Henriksson ............. C02F 11/00 |

OTHER PUBLICATIONS

Pulsemaster/Mark de Boevere, Dec. 4, 2014: "PEF processing of fruits and vegetables: Big advantages", archive.org saved Apr. 18, 2015 (Year: 2015).*

\* cited by examiner

METHOD AND DEVICE FOR TREATING NUTS, IN PARTICULAR FOR PRODUCING NUTS WITH IMPROVED SHELLING PROPERTIES

The present invention relates to a method for treating shell-fruits, in particular for producing shell-fruits with improved shelling properties in comparison to untreated shell-fruits.

The present invention further relates to a device for treating shell-fruits, in particular for producing shell-fruits with improved shelling properties in comparison to untreated shell-fruits, comprising a hermetically sealable treatment chamber for conditioning the shell-fruits.

Shell-fruits, also referred to as nuts (in German: Schalenobst), is a collective term for most edible nuts and kernels. As a common feature, these shell-fruits have a pericarp which can generally not be consumed. Only the kernel (also fruit kernel, fruit body), i.e. the seed, is usually edible. Shell-fruits provide a pool of constituents that can be used in the food and chemical industries. In addition, edible fruit kernels of shell-fruits are in demand in the food service industry and grocery stores.

For the consumption of fruit kernels of shell-fruits, such as cashew nuts or Brazil nuts, it is desirable to separate the fruit kernel in one piece from the non-edible shell. Conventional methods treat shell-fruits prior to the shelling step, where the inedible shell/pericarp is broken open and the kernel is made accessible by thermal processes, for example, in that the shell-fruits are heated or steamed before they are shelled.

However, even with thermal pretreatment of shell-fruits, a relatively high percentage of fruit kernels that cannot be separated from their shell completely in one piece, i.e. as a whole, remain. Such breakage reduces the value, so that minimizing the percentage of breakage is desirable.

In addition, high temperature thermal processes can be disadvantageous in that valuable constituents of the shell-fruits, such as certain oils, thermally decomposed.

Numerous methods and devices intended to optimize the shelling process of shell-fruits are known from prior art. For example, GB 860,967 and WO 2016/157215 A1 shall presently be mentioned. However, the machines described therein do not solve the problem of breakage when the fruit kernel is separated from the opened shell.

In view of the above-mentioned problems, it is the object of the present invention to provide a method and a device for treating shell-fruits which do not damage the contents of the fruit kernel and simultaneously permit improved shelling of the shell-fruits and the opened shell to be better separated from the fruit kernel.

The present invention satisfies this object with a method for treating shell-fruits of the type mentioned, which comprises the following treatment step for the shell-fruits: a) softening the shell around a fruit body of the shell-fruits by applying an electric field.

The above-mentioned device for treating shell-fruits satisfies this object in that it comprises at least one capacitor for generating an electric field in the treatment chamber.

It has been observed that the shell and the inner skin of the shell-fruits soften when an electric field is applied. Softening means weakening the support structure of, for example, the membranes or supporting structure of the nut cells, which, inter alia, causes constituents, such as oils, to escape from the cells. Softening the shell-fruits also makes shelling easier. The fruit kernels are easier to remove from the shell because the fruit bodies become less brittle and the inner skin surrounding the fruit kernels is perforated. The electric field applied can be, in particular, a non-thermally acting electric field in which the upper energy limit is determined such that substantially no heating of the shell-fruits in the sense of ohmic heating takes place.

Improved shelling properties of the nuts treated according to the present invention in comparison to untreated shell-fruits is understood to mean that the treated shell-fruits can be shelled easier, i.e. at more favorable conditions, such as lower pressure, or at simpler conditions, and/or that a higher percentage of the fruit kernels can be separated in one piece from the shell.

The invention can be further improved by the following developments, which are advantageous each by itself and can be combined with one another as desired, and advantageous embodiments.

When applying the electric field, an energy input of at least 1 kJ/kg can be applied to the shell-fruits. Energy input of this magnitude is particularly well suited to soften the shell of the shell-fruits and to separate it from the kernel or to extract the constituents particularly effectively, respectively. In order to further optimize the energy input and avoid unnecessary over-processing of the shell-fruits, the energy input into the nuts can preferably be in the range from 3 to 8 kJ/kg of nuts.

It has been observed that it is advantageous if an electric field of 0.5 kV/cm to 2 kV/cm is applied. Such field strengths can be obtained with commercially available industrial capacitors and prevent unwanted thermal effects from occurring which would lead to unwanted product changes.

The fruit body can be softened particularly effectively using electrical pulses. For this purpose, the device according to the invention can comprise, for example, at least two electrodes which are connected to a pulse generator. The electric field, in particular, the electrical pulses, can be generated both by direct contact of the capacitor or its electrodes, respectively, with the shell-fruits, as well as by way of conductive fluids, where the shell-fruits are totally or in part inserted into the conductive fluids. Different electrode shapes can there be employed, for example plate, ring, grid, hollow or flow-through electrodes. A high voltage pulse generator generating electric fields in the form of short pulses in the micro to millisecond range of a high voltage in the kilovolt range can preferably be used as the pulse generator. Such high voltage pulses cause electroporation in the treated shell-fruits which causes, in particular, permeabilization of the cell membrane, which facilitates the escape of constituents such as oils and softens the structure of the fruit body in a particularly simple and non-thermal manner. In terms of time and energy optimization, the fruit body can be softened with at least 10 electrical pulses, preferably 10 to 200 electrical pulses, and more preferably 30 to 50 electrical pulses.

According to a further embodiment, the method according to the invention comprises further treatment step b) of conditioning the shell-fruits. Conditioning means an adaptation of the shell-fruits to their further processing. The method according to the invention for treating shell-fruits or the device according to the invention, respectively, can be used, in particular, in the context of producing shell-fruits with improved shelling properties, but also with regard to the improved extraction of constituents, improved removal of undesired constituents, for example toxins.

According to one embodiment, the shell-fruits can be conditioned by applying an overpressure and/or an increase in temperature and/or exposing them to a conditioning substance or agent. For this purpose, the device according to the invention can comprise, in addition to the hermetically sealable treatment chamber, a heating element and/or comprise a dosing inlet that opens into the treatment chamber. A hermetically sealable treatment chamber is understood to be a chamber which can be configured such that an overpressure can be generated and maintained therein. In order to regulate the overpressure in the treatment chamber, the device according to the invention can comprise a pressure regulator, for example, a pressure relief valve.

According to a further embodiment of the method according to the invention, step a) of applying the electric field can be performed simultaneously with or prior to step b) of conditioning. When simultaneously applying the electric field and performing conditioning, one method step is saved from a temporal perspective and the duration of the treatment can be reduced overall. When conditioning after applying the electric field, the two steps can be better coordinated and better optimized with regard to subsequent treatment steps.

According to one further embodiment, the temperature can be raised in step b) to above 100° C., preferably to 100° C. to 120° C. Such an increase in temperature, for example, when treating cashew nuts, leads to the fact that unwanted toxins can be reliably thermally broken down without damaging desired constituents, for example oils. In addition, this thermal kind of conditioning promotes shelling or detaching the fruit body from the shell of the shell-fruits in an improved manner.

According to one further embodiment, overpressure of at least 1 bar, preferably overpressure of 1 to 3 bar, can be applied in step b), which also has a beneficial effect regarding the escape and the subsequent recovery of cell constituents. According to one embodiment, the temperature can be increased in step b) to above 100° C., preferably to 100° C. to 120° C., and overpressure of at least 1 bar, preferably 1 to 3 bar, can be applied.

It has been found that the treatment time in step b) of conditioning can be less than 40 minutes, preferably less than 30 minutes, and particularly preferably less than 20 minutes, which raises the throughput in the treatment method or device according to the invention, respectively. Reduced treatment time is also advantageous from an energy perspective.

According to one further embodiment, steam treatment, for example, water vapor treatment, can be performed in step b). Steam treatment combines conditioning by way of temperature and pressure increase in an advantageous and simple manner. The steam as a fluid medium can particularly well penetrate the shell-fruits as a treatment substance. In addition, if water vapor acts subject to overpressure, it is possible to proceed in a simple, reliable and food-safe manner in the particularly preferred temperature and overpressure range described above.

According to one further embodiment, the method according to the invention can comprise at least one of the following steps subsequent to treatment steps a) and optionally b):
  c) shelling the treated shell-fruits;
  d) drying the shell-fruits, preferably the shelled shell-fruits;
  e) removing a skin of the shell-fruits;
  f) separating the fruit bodies from the remainder of the shell-fruits;
  g) crushing the shelf-fruits; and
  h) extracting a constituent, preferably from the remainder of the shell-fruits, where the constituent is preferably an oil.

Depending on the objective with which the method according to the invention for treating shell-fruits is employed, one or more of steps c) to g) can follow treatment steps a) and b). When the method according to the invention is employed, for example, in connection with a method for obtaining a constituent from a shell-fruit, for example, only step h) or respectively steps g) and h) could follow. If the method according to the invention is employed in connection with producing fruit bodies and shell-fruits, then steps c) and f) or respectively steps c) to f) could follow.

The shell-fruit to be treated can be selected, for example, from the group consisting of: beechnut, nut, chestnut, sweet chestnut, acorn, almond, pistachio, pine nuts, kernels, apricot kernels, grated coconut. A nut according to the present invention comprises not only nuts in the botanical sense, but also in the linguistic sense. For example, the nut can be, for example, a nut which is preferably selected from the group consisting of: hazelnut, walnut, peanut, hemp nut, macadamia nut, sycamore nut, tagua nut, water caltrop, cashew nut, Brazil nut, pecan nut, shea nut, marl nut, coconut, nutmeg seed.

In the following, the invention shall be described by way of example in detail with reference to the drawings and subsequent experimental examples using advantageous embodiments. The advantageous further developments and configurations illustrated there are each independent of each other and can be combined with one another at random, depending on the requirement of the application, where:

Figure 1:
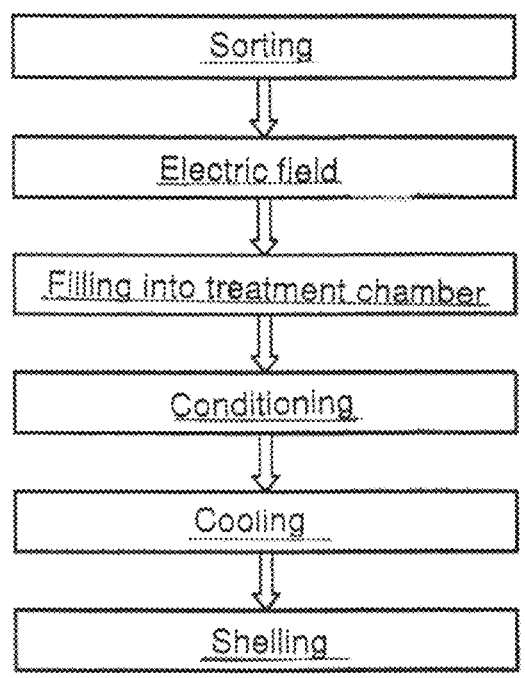
FIG. 1 shows an exemplary method for treating shell-fruits according to an exemplary embodiment.

Hereafter, an exemplary method for treating shell-fruits according to the present invention shall be presented with reference to the flow diagram in FIG. 1.

The method according to the invention for treating shell-fruits, comprising softening a fruit body of the shell-fruits by applying an electric field, is embedded in a method for producing shell-fruits with improved shelling properties in comparison to untreated nuts.

The flow diagram of FIG. 1 therefore overall represents, by way of example, a method for shelling shell-fruits, such as cashew nuts.

In methods customary in the trade for shelling shell-fruits, such as cashew nuts, the shell-fruits are sorted in one step, for example, in a perforated cylinder, to obtain groups of evenly sized cashew nuts.

In conventional methods for shelling cashew nuts, the cashew nuts after sorting are filled directly into a treatment chamber in which the cashew nuts are then conditioned. The conditioning can be effected, for example, by steam treatment at temperatures of 110° C. to 116° C. and overpressure of 1.0 bar to 2.5 bar with a treatment time of 20 to 30 minutes.

After steam treatment, the nuts to be shelled are cooled down, for example, for 10 to 12 hours at room temperature and then shelled using a shelling machine.

The method according to the invention for treating shell-fruits, in particular, for producing shell-fruits with improved shelling properties in comparison to untreated shell-fruits, comprises the step of softening a fruit body of the shell-fruits by applying an electric field.

In the flow diagram of the exemplary method of FIG. 1, the softening step by applying an electric field takes place between the step of sorting and filling into the treatment chamber.

As shall be explained below, however, the step of applying an electric field to soften a fruit body can also be performed simultaneously with the conditioning in the treatment chamber.

Figure 2:
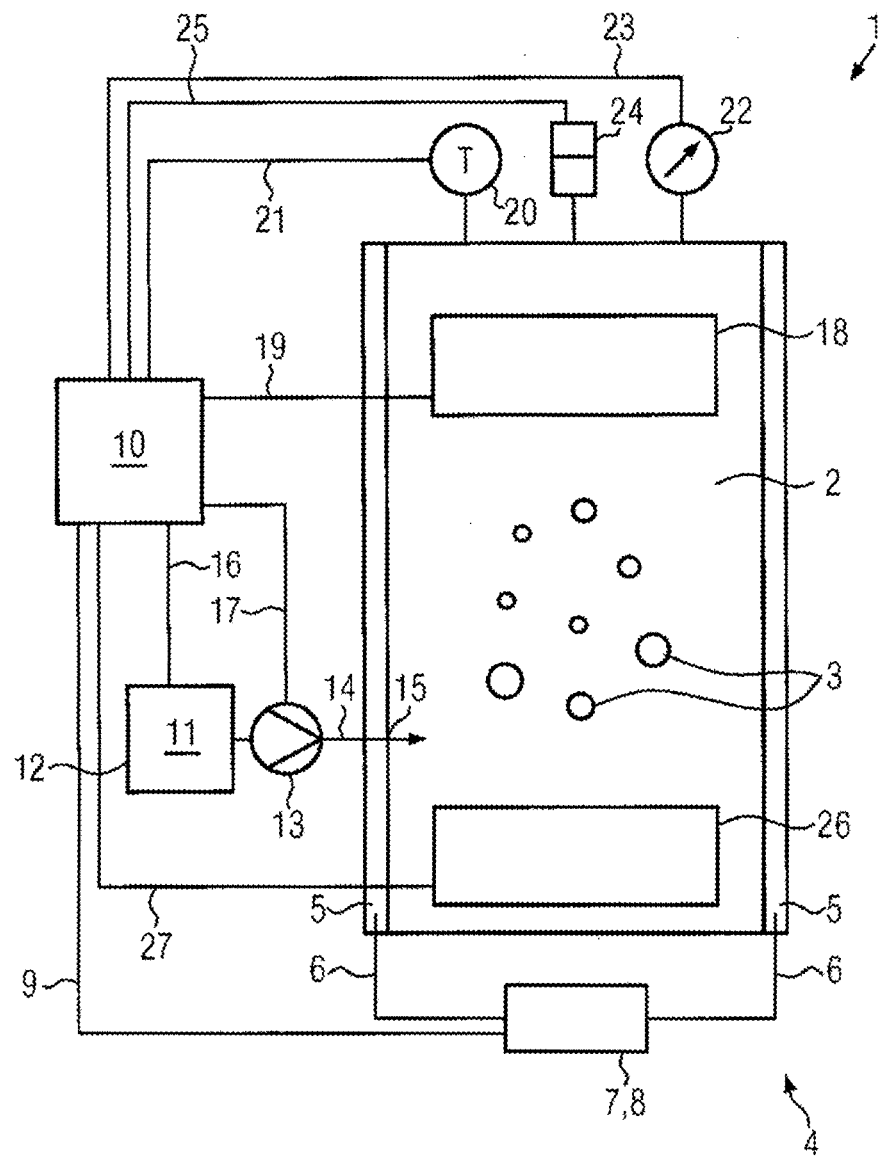
FIG. 2 shows an exemplary embodiment of a device according to the invention for treating shell-fruits.

A device for such an application where an electric field is simultaneously applied and the shell-fruits are conditioned in a treatment chamber is shown in an exemplary embodiment in FIG. 2.

Device 1 shown in FIG. 2 comprises a hermetically sealable treatment chamber 2 into which shell-fruits 3, illustrated by way of example as circles, can be filled and conditioned. Device 1 of FIG. 2 further comprises a capacitor 4 for generating an electric field in treatment chamber 2. Capacitor 4 in the illustrated embodiment comprises two electrodes 5 which are connected via power lines 6 to a voltage source 7. In the embodiment shown, the two electrodes 5 of capacitor 6 are arranged on oppositely disposed sides and parallel to each other. A homogeneous electric field for uniform sample treatment can be generated with such an electrode arrangement. However, other variants of the electrode arrangement are also conceivable, for example, a coaxial or collinear arrangement.

A pulse generator, for example, a high-voltage pulse generator, such as a Marx generator, can be used as a voltage source with which electrical pulses of a high voltage in the kilovolt range and of short duration in the micro to millisecond range can be generated.

To soften a fruit body, at least 10 electrical pulses, preferably 10 to 200 and, particularly preferably, 30 to 50 electrical pulses can be introduced. When an electric field of 0.5 to 2 kV/cm is applied, an energy input into the shell-fruits of more than 1 kJ, for example, 5 to 20 kJ/kg, is obtained.

The voltage source is connected via a control line 9 to a central control unit 10 which controls the voltage source.

In treatment chamber 2, shell-fruits 3 can be conditioned in various ways.

A first conditioning option is to allow a conditioning substance or agent 11 to act on shell-fruits 3. In the embodiment shown by way of example, conditioning agent 11 is stored in a storage container 12 and can be introduced by way of a pump 13 from storage container 12 via a supply line 14 through a dosing inlet 15 that opens into treatment chamber 2.

In the embodiment shown, the opening of inlet 15 is arranged by way of example in a side wall of treatment chamber 2. It is equally possible to provide the inlet opening in the region of the base or the ceiling of the treatment chamber, or to provide several inlet openings at different locations of treatment chamber 2.

Storage container 12, in particular a level indicator (not shown) of the storage container, which outputs a signal when conditioning agent is to be topped up, or pump 13, respectively, is connected via control lines 16 and 17 to central control unit 10. In this way, control unit 10 can regulate pump 13 and thereby the supply of conditioning agent into the treatment chamber or output a warning signal when conditioning agent 11 is to be topped up in storage container 12.

A further conditioning option is to heat shell-fruits 3. Device 1 of FIG. 2 shown by way of example comprises a heating element 18 for this purpose. Heating element 18 is connected via a further control line 19 to control unit 10, so that control unit 10 can actuate heating element 8 and a desired temperature can then be adjusted in treatment chamber using heating element 8. A closed loop can be accomplished in that device 1 further comprises a temperature measuring device 20 which is also connected to control unit 10 via a further control line 21.

Another type of conditioning can be achieved according to exemplary device 1 by applying overpressure. The embodiment of device 1 shown by way of example comprises a pressure gauge 22 which measures the pressure in the treatment chamber and can output it via a further control line 23 to control unit 10. Furthermore, device 1 of the exemplary embodiment comprises a pressure valve 24 which is connected via a further control line 25 to control unit 10. Control unit 10 can output a control signal via control line 25 to pressure valve 24 and open or close the latter in order to adjust the pressure in treatment chamber 2. An overpressure can be obtained in the treatment chamber, for example, by introducing compressed air or by way of a compressor which compresses a fluid disposed in treatment chamber 2 (not shown).

The embodiment shown by way of example generates the overpressure in that a conditioning agent 11, for example water, introduced into treatment chamber 2 is heated using heating element 18. Since treatment chamber 2 can be closed hermitically or in fluid-tight manner, an overpressure can be established in treatment chamber 2 when heating conditioning agent 11. Steam at a temperature of 110° C. to 120° C. and an overpressure of 1 to 2.5 bar can be generated in the treatment chamber in this way.

Instead of a pressure gauge 22 and a pressure valve 24, both of which are connected via control line 23, 25 to a control unit 10, only a pressure relief valve (not shown) could be provided which opens when a predetermined overpressure is exceeded and thus maintains the pressure in treatment chamber 2 at a predetermined value in a simple manner.

For homogeneous distribution of shell-fruits 3 to be treated, device 1 shown by way of example comprises a mixer 26, for example, a stirring unit. Mixer 26 can again be connected via a control line 27 to and be controlled by central control unit 10.

Exemplary embodiments of the method according to the invention shall be described below on the basis of some concrete experimental results.

Experiment 1

Treating shell-fruits by way of steam conditioning and applying an electric field to produce shell-fruits with improved shelling properties.

In this series of experiments, cashew nuts were used as exemplary shell-fruits.

Three sample groups and one control group were prepared:

The cashew nuts of all samples were subjected to steam treatment. For this purpose, 10 nuts were filled into a steam boiler with 750 ml of water. Steam treatment at temperatures of 110 to 116° C., a pressure of 1.5 bar was performed in the steam boiler for a treatment time of 20 minutes. Prior to conditioning by steam treatment, the cashew nuts were pretreated as follows:

a. untreated cashew nuts (control sample);
b. Cashew nuts into which an energy input of 5 kJ/kg was introduced;
c. Cashew nuts into which an energy input of 10 kJ/kg was introduced;
d. Cashew nuts into which an energy input of 20 kJ/kg was introduced.

For the energy input, the cashew nuts were exposed to electrical pulses of an electric field of 1.07 kV/cm. Depending on the sample, the cashew nuts were treated with 45 pulses (sample b corresponding to 5 kJ/kg), 90 pulses (sample c corresponding to 10 kJ/kg) and 181 pulses (sample d corresponding to 20 kJ/kg).

Figure 3:
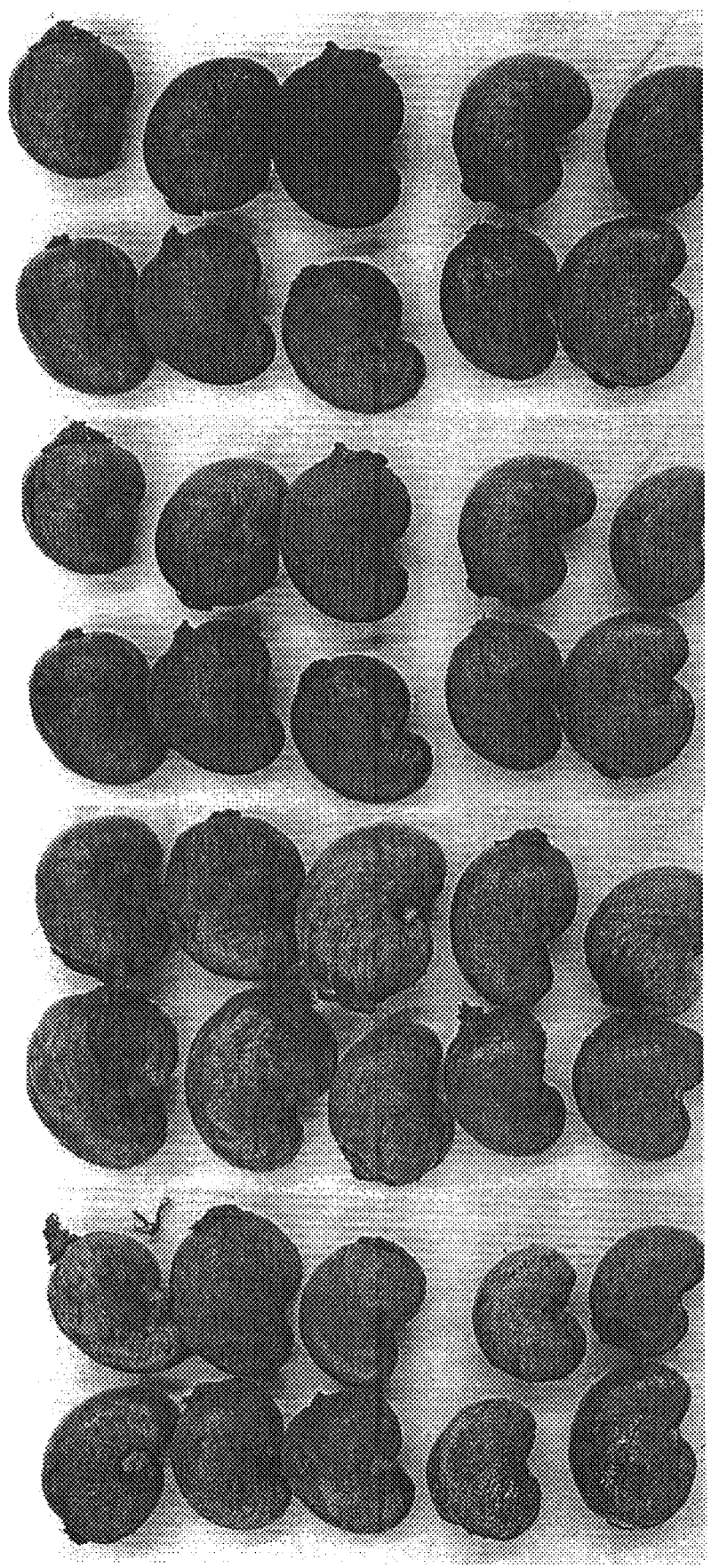
FIG. 3 shows cashew nuts exposed to an electric field as well as to steam treatment.

FIG. 3 shows the external appearance of the cashew nuts after their steam treatment.

As can be seen in FIG. 3, the more energy is introduced by way of electrical pulses, the darker the cashew nuts become. The cashew nuts darkening is an indication that the fruit bodies soften and nut oils and nut acids leak out of the cells during the steam treatment.

After the conditioned nuts were cooled down overnight at room temperature for about 18 hours, they were shelled by use of a knife.

Figure 4:
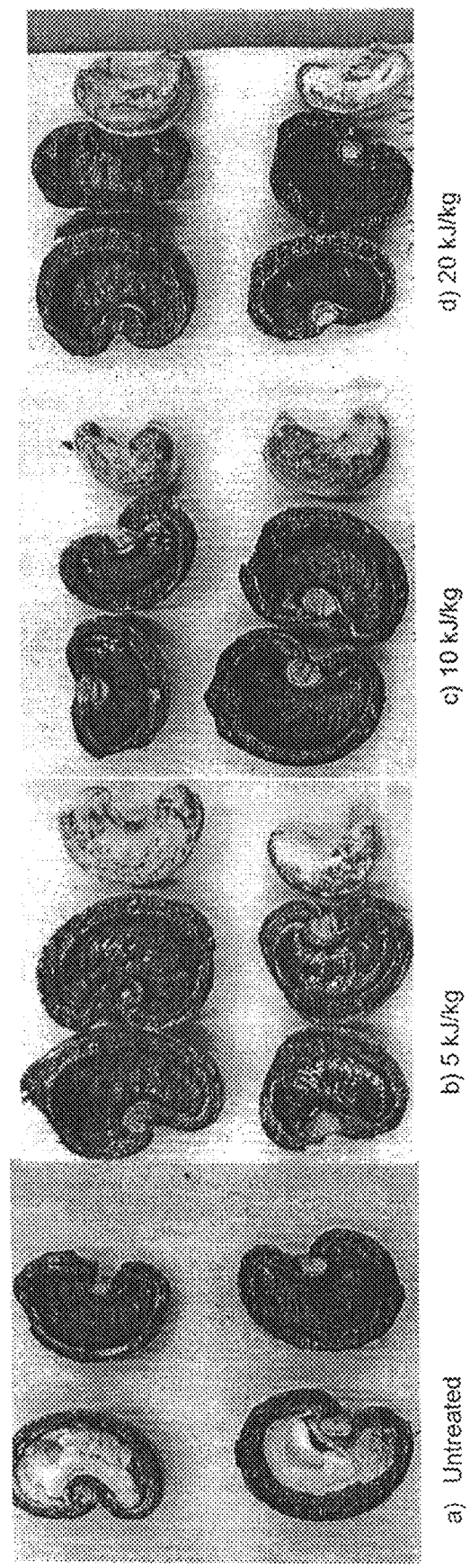
FIG. 4 shows images of shelled cashew nuts of FIG. 3.

Illustrations of the shelled samples are shown in FIG. 4. It can be clearly seen in FIG. 4 that the nuts, in which the fruit bodies were softened by applying an electric field, could be easily extracted as a whole, without fractures, from the shell. The untreated sample on the other hand, which was only exposed to steam conditioning and no electric field, broke several times during shelling and the attempt to extract the fruit body from the shell.

Figure 5:
FIG. 5 shows an enlarged view of a cashew nut which has been treated only with steam and not with an electric field.

It can also be seen in FIG. 4 that the shells of the samples which were additionally treated with electric fields have more moisture. This indicates the release of constituents, such as oils, from the nuts. In contrast to the cashew nuts which were pretreated by ways of electric fields, the cashew nut of the untreated samples often broke when extracted from the shell (see FIG. 5), which is due, inter alia, to the fact that the epidermis of the nut stuck to the shell in the untreated samples.

This series of experiments has therefore shown that it is possible to produce shell-fruits with improved shelling properties using the method according to the invention or to improve the extraction of constituents from the shell-fruits.

Experiment 2

Improving the shelling properties and determining the moisture content of shell-fruits using cashew nuts as an example.

In this series of experiments, the moisture content and the shelling properties of cashew nuts were investigated in which the fruit bodies were softened by applying an electric field and which were then conditioned by steam treatment.

For this purpose, the following control groups and samples were prepared:

a. a first control group that was not exposed to any electric field and was subjected to steam treatment for 30 minutes;
b. a second control group that was not exposed to an electric field and was subjected to steam treatment for 20 minutes;
c. a sample of cashew nuts into which an energy input of 5 kJ/kg of electrical energy was introduced and which were subsequently subjected to steam treatment for 20 minutes.

The energy input of 5 kJ/kg was effected by the action of 45 pulses of an electric field of 1.07 KV/cm. The pulse width was 5-50 µs, depending on the filling quantity, the conductivity and the electrode capacity.

The nuts of the sample and control groups, respectively, were subsequently subjected to steam treatment, as was done with experimental series 1.

After steam treatment, the cashew nuts were cooled down in an open vessel for about twelve hours at room temperature, and the moisture content of the nuts was then determined in a moisture balance with halogen heating.

Figure 6:
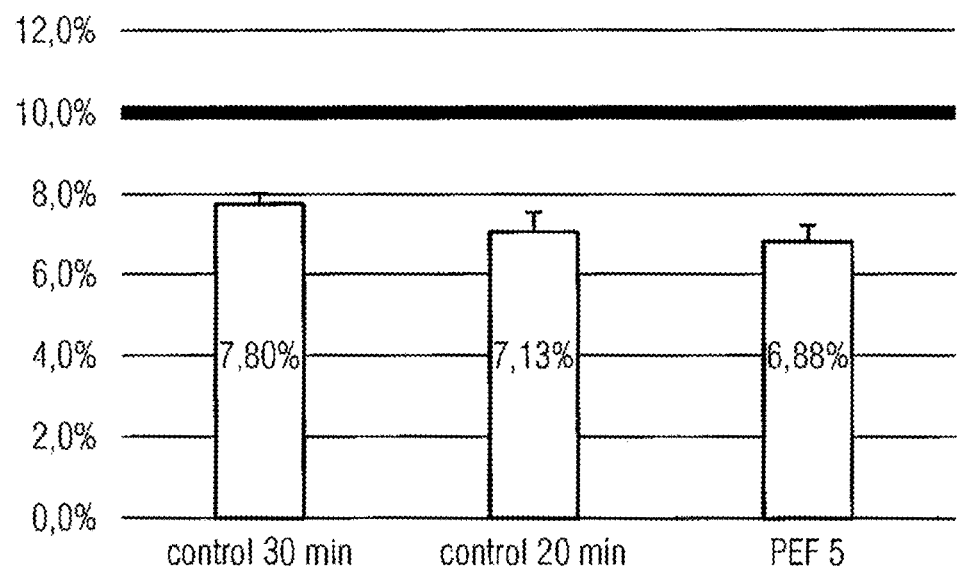
FIG. 6 shows a bar graph showing the moisture content of cashew nuts treated with steam or subjected to steam treatment and an electric field after shelling.

The moisture contents of the samples used are shown in FIG. 6. FIG. 6 shows that the moisture content of all samples is below a moisture content of 10%, which is common for cashew nuts that are subjected to steam treatment.

After cooling, the nuts were shelled.

Figure 8:
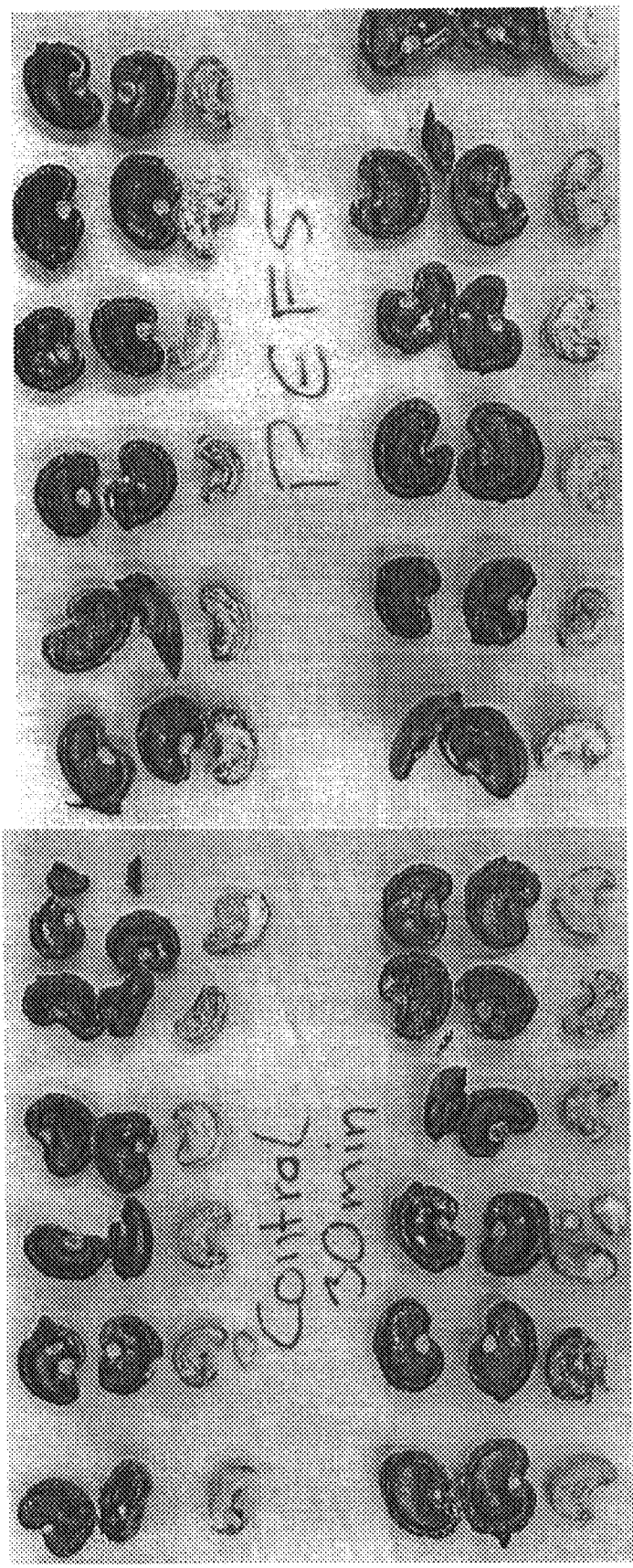
FIG. 8 shows images of shelled cashew nut samples which have been subjected only to steam treatment or to steam treatment and additionally an electric field.

Illustrations of the nuts of control group a) and of sample group c) are shown in FIGS. 8a and 8b, respectively. FIG. 8 shows that the nuts of the control group, in which the fruit bodies were not softened by the application of an electric field, frequently broke out of the shells during shelling and extraction. By contrast, in the case of the nuts treated according to the method of the invention, the fruit bodies could be separated from the shell in a simple and complete manner.

The nuts were then dried at 72° C. for seven to eight hours to remove the shell skin from the fruit bodies.

Figure 7:
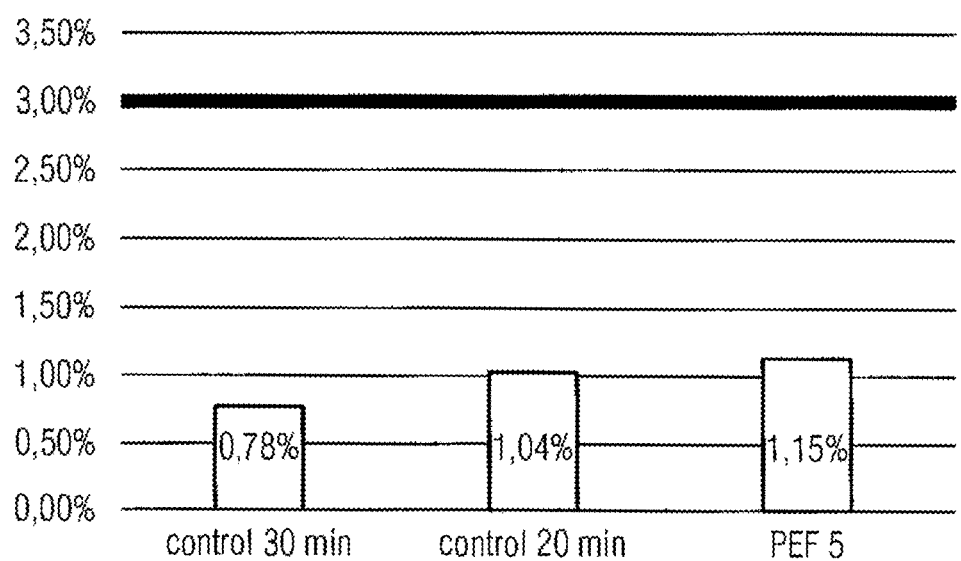
FIG. 7 shows a bar graph of the liquid content of the samples of FIG. 6 after an additional drying step.

The moisture contents of dried samples a) to c) are shown in FIG. 7. The moisture content was in all cases below 3%, which is the common moisture content for dried cashew nuts.

Finally, the dried cashew nuts of samples a) to c) of experimental series 2 were subjected to a sensory examination.

In a visual inspection, it is first be noted that the shell-fruits of group a), which have been steam treated for 30 minutes, are darker than the shell-fruits of groups b) and c), which have been steam treated for a shorter time.

The sensory taste examination delivered the following results:

control group a): crisp, hard, roasted taste, taste reminiscent of peanut flavor, no cashew flavor
control group b): crisp, hard, no roasting flavors, no cashew flavor
control group c): softer than the control groups (however hard structure comparable to cashew nuts in the market), cashew flavor The above experimental examples demonstrate by way of example that shell-fruits can be treated using the method according to the invention, for example, to improve their shelling properties or to better remove constituents from the shell-fruits.

REFERENCE NUMERALS 1 device
2 treatment chamber 3 shell-fruits
4 capacitor
5 electrodes
6 power lines
7 voltage source
8 pulse generator
9 control line
10 control unit
11 conditioning agent
12 storage container
13 pump
14 supply line
15 insertion opening
16 control line
17 control line
18 heating element
19 control line
20 temperature measuring unit
21 control line
22 pressure gauge
23 control line
24 pressure valve
25 control line
26 mixer/stirring unit
27 control line

The invention claimed is:

1. A method for treating nuts, said method comprising a treatment step for said nuts comprising:
   softening a shell of said nut by applying a non-thermally acting electric field thereto sufficient to cause electroporation.

2. The method according to claim 1, where when applying the electric field, an energy input of at least 1 kJ/kg is applied to said nuts.

3. The method according to claim 1, where an electric field of 0.5 kV/cm to 2 kV/cm is applied.

4. The method according to claim 1, where the shell is softened by way of electrical pulses.

5. The method according to claim 4, where said shell is softened with at least 10 electrical pulses.

6. The method according to claim 1, comprising a further treatment step of:
   conditioning said nuts shell nuts by applying a conditioning agent, or by heating, or by applying an overpressure.

7. The method according to claim 6, where said nuts are conditioned by applying an overpressure, by increasing the temperature, and by applying a conditioning agent.

8. The method according to claim 6, where the step of applying the electric field is carried out simultaneously with or prior to the step of conditioning.

9. The method according to claim 7, where the temperature is increased to above 100° C., and/or the overpressure of at least 1 bar is applied for the step of conditioning.

10. The method according to claim 6, where the treatment time in the conditioning step is less than 40 minutes.

11. The method according to claim 6, where steam treatment is performed in the step of conditioning.

12. The method according to claim 1, comprising at least one of the following steps subsequent to the treatment step of softening and optionally a step of conditioning:
   a) shelling said treated nuts;
   b) drying said nuts;
   c) removing a skin of said nuts;
   d) separating fruit kernels from the remainder of said nuts;
   e) crushing said nuts; and
   f) extracting a constituent.

13. The method according to one of the claim 1, where said nuts are selected from the group consisting of: beechnut, nut, chestnut, sweet chestnut, acorn, almond, pistachio, pine nuts, kernels, apricot kernels, grated coconut.

14. The method according to claim 2, where the electric field of 0.5 kV/cm to 2 k V/cm is applied.

15. The method according to claim 7, where the step of applying the electric field is carried out simultaneously with or prior to the step of conditioning.

16. The method according to claim 8, where the temperature is increased to above 100° C., and/or the overpressure of at least 1 bar is applied for the step of conditioning.

17. The method according to claim 7, where the treatment time in the step of conditioning is less than 40 minutes.

18. The method according to claim 8, where the treatment time in the step of conditioning is less than 40 minutes.

19. The method according to claim 2, where when applying the electric field, the energy input from 3 to 8 kJ/kg is applied to said nuts.

20. The method according to claim 5, where said shell is softened with 10 to 200 electrical pulses.

21. The method according to claim 9, where the temperature is increased in the step of conditioning to 100° C. to 120° C., and/or the overpressure of 1 bar to 3 bar is applied.

22. The method according to claim 10, where the treatment time in the step of conditioning is less than 30 minutes.

23. The method according to claim 12, where the step of drying said nuts comprises the step of drying said treated nuts after the step of shelling.

24. The method according to claim 12, where the step of extracting a constituent comprises the step of extracting an oil constituent from the remainder of said nut.

25. The method according to claim 16, where the treatment time in the step of conditioning is less than 30 minutes.

26. The method according to claim 18, where the treatment time in the step of conditioning is less than 30 minutes.

* * * * *